United States Patent Office 3,082,092
Patented Mar. 19, 1963

---

3,082,092
METHOD OF MAKING AN ALIMENTARY PASTE PRODUCT
Fileno De Felice, Spokane, Wash., assignor to U.S. Macaroni Mfg. Co., Inc., Spokane, Wash., a corporation of Washington
No Drawing. Filed June 30, 1961, Ser. No. 120,971
1 Claim. (Cl. 99—85)

This invention relates to improvements in alimentary paste products such as macaroni, spaghetti and the like. It is the purpose of the present invention to provide an improved flour base from which the extruded paste products are made, which increases the efficiency of the entire operation from the mixing of the paste to the drying of the finished product, and also improves the cooking quality and taste of the finished product.

In the making of alimentary paste products the wheats commonly used are the flour making hard wheats. These wheats have a high protein content which is desirable. For example, Durham wheat averages 12–14% protein by volume. It is desirable to have a protein (or gluten) content of 11½% and high in the paste. One of the problems in using such high protein wheat is that the gluten makes the paste quite sticky and difficult to mix and also troublesome to keep the strings of extruded paste from sticking to each other. It is also difficult to dry.

The gluten in wheat flour makes it difficult to mix the flour with water and makes the water-flour paste very sticky. I have found a way to make the flour take up water more readily and reduce the stickiness of the paste while still maintaining a high protein content product. By incorporating in the dry flour another cereal grain flour, I can reduce the stickiness of the paste and increase the volume of flour that a mixer will handle by up to about 10%. I substitute for the high protein wheat flour an amount of this cereal grain flour that varies somewhat, depending upon the gluten content of the wheat flour. In general the higher the gluten content the greater the amount of substitute must be used.

The cereal flour used is corn flour. Depending upon the gluten content of the wheat flour, I use from 15% to 22% by volume of corn flour. The corn flour is ground to substantially the same fineness as the wheat flour used and is mixed thoroughly with the wheat flour before adding water. For example, with each 500 bu. of wheat flour, I mix in 75 bu. to 110 bu. of corn flour. The corn flour I use has a protein content by volume of the order of 9%. If the wheat flour has a protein content of 12% and it is mixed with corn flour in proportions by volume of 100 bu. wheat flour and 15 bu. corn flour having 9% protein content, the resulting mixture has slightly over 11.5% protein content. If the wheat flour used has 14% protein content, then I may use 22 bu. of corn flour per 100 bu. of wheat flour and the resulting mixture has slightly over 13% protein. Amounts of 22% corn flour should only be used with the higher gluten content wheat flours. The gluten is essential to make the extruded paste product stable enough so that the materials will hang together after pressing and when cooked. Amounts below 15% of corn flour have not proven effective in eliminating the stickiness. If the proportion of corn flour is increased to 25% of the volume of wheat flour used, then it is detrimental to the final product because the paste does not have enough stability and when extruded through the press it will not hang together.

The results obtained in incorporating corn flour in the alimentary paste products in the amounts set forth above, have been quite surprising. I have found that for the same speed of mixing it takes less power to operate the mixer that works the water into the flour. Another advantage I have found lies in the drying of the extruded paste. These alimentary paste products are dried in drying chambers wherein the material passes through the chamber while a certain ratio of temperature to humidity is maintained within the chamber. I find that incorporation of corn flour in the proportions given makes it possible to effect the same drying with a lower temperature in proportion to the humidity in the chamber.

Another noticeable production improvement has occurred in the handling of the extruded product from the press to the drying chambers. With extruding dies lined with the plastic material sold under the name "Teflon" (which is now used quite largely because of its superior wearing qualities) the all wheat flour paste has given trouble because of the strings adhering to each other after leaving the dies. Apparently this was in part due to electrostatic charge. When the extruded product contained corn flour in the proportions mentioned, this difficulty was overcome.

The product, when finished, apparently has a very acceptable flavor and it does have a more attractive appearance. The all wheat flour macaroni has a flat white appearance, when cooked, that is not very appetizing in appearance. The macaroni embodying the corn flour has the golden color of the corn flour blended with the flat white color and appears richer and more appetizing.

The corn flour used has all of the hull of the corn removed which, of course, is also true of the wheat flour which has the wheat hull removed.

It is believed that the nature and advantages of my invention will be clear from the foregoing description.

Having described my invention, I claim:

The method of making an alimentary paste product which consists in first combining hard wheat flour, having a gluten content of the order of 12% by volume, with a corn flour, having a protein content of the order of 9% by volume, while dry in proportions of between 15 and 22 parts corn flour per hundred parts of wheat flour by volume, then mixing the combined flour with water, extruding the paste thus formed and then drying the same.

References Cited in the file of this patent
UNITED STATES PATENTS

| | | |
|---|---|---|
| 466,230 | Gent | Dec. 29, 1891 |
| 492,969 | Putnam | Mar. 7, 1893 |
| 2,085,421 | Donk | June 29, 1937 |
| 2,677,613 | Shiah | May 4, 1954 |

FOREIGN PATENTS

| | | |
|---|---|---|
| 813,731 | Great Britain | May 21, 1959 |